(12) United States Patent
Ishimaru et al.

(10) Patent No.: US 12,483,041 B2
(45) Date of Patent: Nov. 25, 2025

(54) ELECTRONIC DEVICE AND CONTROL METHOD

(71) Applicant: CANON KABUSHIKI KAISHA, Tokyo (JP)

(72) Inventors: Satoshi Ishimaru, Kanagawa (JP); Takamichi Kosugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 18/067,292

(22) Filed: Dec. 16, 2022

(65) Prior Publication Data

US 2023/0198268 A1  Jun. 22, 2023

(30) Foreign Application Priority Data

Dec. 20, 2021 (JP) ................. 2021-206273

(51) Int. Cl.
*H02J 7/14* (2006.01)
*H02J 7/00* (2006.01)

(52) U.S. Cl.
CPC ............... *H02J 7/00043* (2020.01)

(58) Field of Classification Search
CPC .... H02J 7/0043; H02J 7/00714; H02J 7/1469; H02J 2207/20
USPC ........................................ 320/134
See application file for complete search history.

(56) References Cited

U.S. PATENT DOCUMENTS

| | | | | |
|---|---|---|---|---|
| 4,553,081 A * | 11/1985 | Koenck | ........... | H02J 7/00036 320/152 |
| 5,027,294 A * | 6/1991 | Fakruddin | ........ | G01R 31/3648 324/426 |
| 5,592,094 A * | 1/1997 | Ichikawa | ........... | H01M 10/44 320/152 |
| 5,883,497 A * | 3/1999 | Turnbull | ........... | H01M 10/48 320/132 |
| 5,963,010 A * | 10/1999 | Hayashi | ............ | H02J 7/0024 320/110 |
| 6,101,339 A * | 8/2000 | Miki | ............... | G03B 7/26 396/301 |
| 6,512,984 B1 * | 1/2003 | Suzuki | ........... | G01R 19/16542 702/63 |
| 7,474,276 B2 * | 1/2009 | Endo | ............ | G09G 5/006 345/9 |
| 7,949,251 B2 * | 5/2011 | Fujita | .......... | H04N 9/8042 396/279 |
| 8,441,232 B2 * | 5/2013 | Hayasaki | ........ | G03B 7/26 320/132 |

(Continued)

FOREIGN PATENT DOCUMENTS

JP   H10187299 A   7/1998

*Primary Examiner* — Alexis B Pacheco
(74) *Attorney, Agent, or Firm* — Canon U.S.A., Inc. IP Division (57) ABSTRACT

An electronic device comprises a power receiving unit and a control unit. In a first mode in which the power receiving unit receives power from a first battery and does not receive power from a second battery, the control unit calculates a first operable time based on a plurality of information relating to the first battery acquired from the first battery, and calculates a second operable time based on information other than information of a discharge current of the second battery among a plurality of information relating to the second battery acquired from the second battery and the information of the discharge current of the first battery acquired from the first battery.

17 Claims, 5 Drawing Sheets

(56) References Cited

U.S. PATENT DOCUMENTS

| | | | | |
|---|---|---|---|---|
| 8,527,224 | B2* | 9/2013 | Watanabe | H01M 10/48 |
| | | | | 702/63 |
| 2004/0014489 | A1* | 1/2004 | Miyachi | H04W 52/0261 |
| | | | | 455/566 |
| 2005/0021253 | A1* | 1/2005 | Tashiro | H02J 7/0013 |
| | | | | 702/63 |
| 2006/0271315 | A1* | 11/2006 | Cargonja | G01R 19/16552 |
| | | | | 702/63 |
| 2006/0274192 | A1* | 12/2006 | Higuchi | H04N 23/65 |
| | | | | 348/370 |
| 2007/0188145 | A1* | 8/2007 | Kim | G01R 31/3646 |
| | | | | 320/132 |
| 2015/0349509 | A1* | 12/2015 | Hingorani | H02H 1/06 |
| | | | | 361/54 |
| 2016/0094067 | A1* | 3/2016 | Li | H02J 7/0013 |
| | | | | 320/137 |
| 2021/0021139 | A1* | 1/2021 | Windsor | H02J 7/0063 |
| 2021/0135487 | A1* | 5/2021 | Sok | G06F 1/30 |

* cited by examiner

| CAPACITY(%) | BATTERY ICON | |
|---|---|---|
| 75(%) < CAPACITY(%) ≤ 100(%) | | 401 |
| 50(%) < CAPACITY(%) ≤ 75(%) | | 402 |
| 25(%) < CAPACITY(%) ≤ 50(%) | | 403 |
| 0(%) < CAPACITY(%) ≤ 25(%) | | 404 |
| COMMUNICATION IS IMPOSSIBLE | | 405 |

ELECTRONIC DEVICE AND CONTROL METHOD

BACKGROUND OF THE DISCLOSURE

Field of the Disclosure

The present disclosure relates to an electronic device to which a plurality of batteries can be connected, a control method, and the like.

Description of the Related Art

As a mode in which a plurality of batteries are connected to an electronic device such as a digital camera to supply power, there are a mode in which power is supplied from a plurality of batteries simultaneously, and a mode in which power is supplied from any one of the batteries. In the mode in which power is supplied from any one of the batteries, the electronic device cannot acquire information of the battery that is not supplying power.

Japanese Patent Laid-Open No. 10-187299 describes a method of acquiring information of a plurality of batteries under the same load condition by arbitrarily switching the battery of the power supply source in an electronic device to which a plurality of batteries can be connected.

However, in the method described in Japanese Patent Laid-Open No. 10-187299, information that cannot be acquired from a battery that is not supplying power cannot be estimated using information acquired from a battery that is supplying power.

SUMMARY OF THE DISCLOSURE

The present disclosure has been made in consideration of the aforementioned issues, and when a plurality of batteries are connected, enables an electronic device to estimate information that cannot be acquired from a battery that is not supplying power using information acquired from a battery that is supplying power.

In order to solve the aforementioned issue, the present disclosure provides an electronic device comprising: a CPU; and a memory storing a program which, when executed by the CPU, causes the electronic device to function as the following units: a power receiving unit that receives power from a first battery and receives power from a second battery; an acquisition unit that acquires from the first battery a plurality of information relating to the first battery, including information of a discharge current of the first battery and acquires from the second battery a plurality of information relating to the second battery, including information of a discharge current of the second battery; and a control unit that calculates a first operable time for which the electronic device can operate using power from the first battery based on the plurality of information relating to the first battery acquired by the acquisition unit and calculates a second operable time for which the electronic device can operate using power from the second battery based on the plurality of information relating to the second battery acquired by the acquisition unit, wherein in a first mode in which the power receiving unit receives power from the first battery and does not receive power from the second battery, the control unit calculates the first operable time based on the plurality of information relating to the first battery acquired from the first battery, and calculates the second operable time based on information other than the information of the discharge current of the second battery among the plurality of information relating to the second battery acquired from the second battery and the information of the discharge current of the first battery acquired from the first battery.

In order to solve the aforementioned issues, the present disclosure provides an electronic device comprising: a CPU; and a memory storing a program which, when executed by the CPU, causes the electronic device to function as the following units: a power receiving unit that receives power from a first battery and receives power from a second battery; an acquisition unit that acquires from the first battery a plurality of information relating to the first battery, including information of a discharge current of the first battery and acquires from the second battery a plurality of information relating to the second battery, including information of a discharge current of the second battery; and a control unit that calculates a first operable time for which the electronic device can operate using power from the first battery based on the plurality of information relating to the first battery acquired by the acquisition unit and calculates a second operable time for which the electronic device can operate using power from the second battery based on the plurality of information relating to the second battery acquired by the acquisition unit, wherein in a case that the control unit performs a predetermined control such that the power receiving unit receives power from the first battery and does not receive power from the second battery, the control unit calculates the first operable time based on the plurality of information relating to the first battery, and calculates the second operable time based on a predetermined information that is acquired from the first battery and cannot be acquired from the second battery in the predetermined control among the plurality of information relating to the second battery and information other than the predetermined information among the plurality of information relating to the second battery.

According to the present disclosure, when a plurality of batteries are connected, information that cannot be acquired from a battery that is not supplying power can be estimated using information acquired from a battery that is supplying power.

Further features of the present disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the present disclosure. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
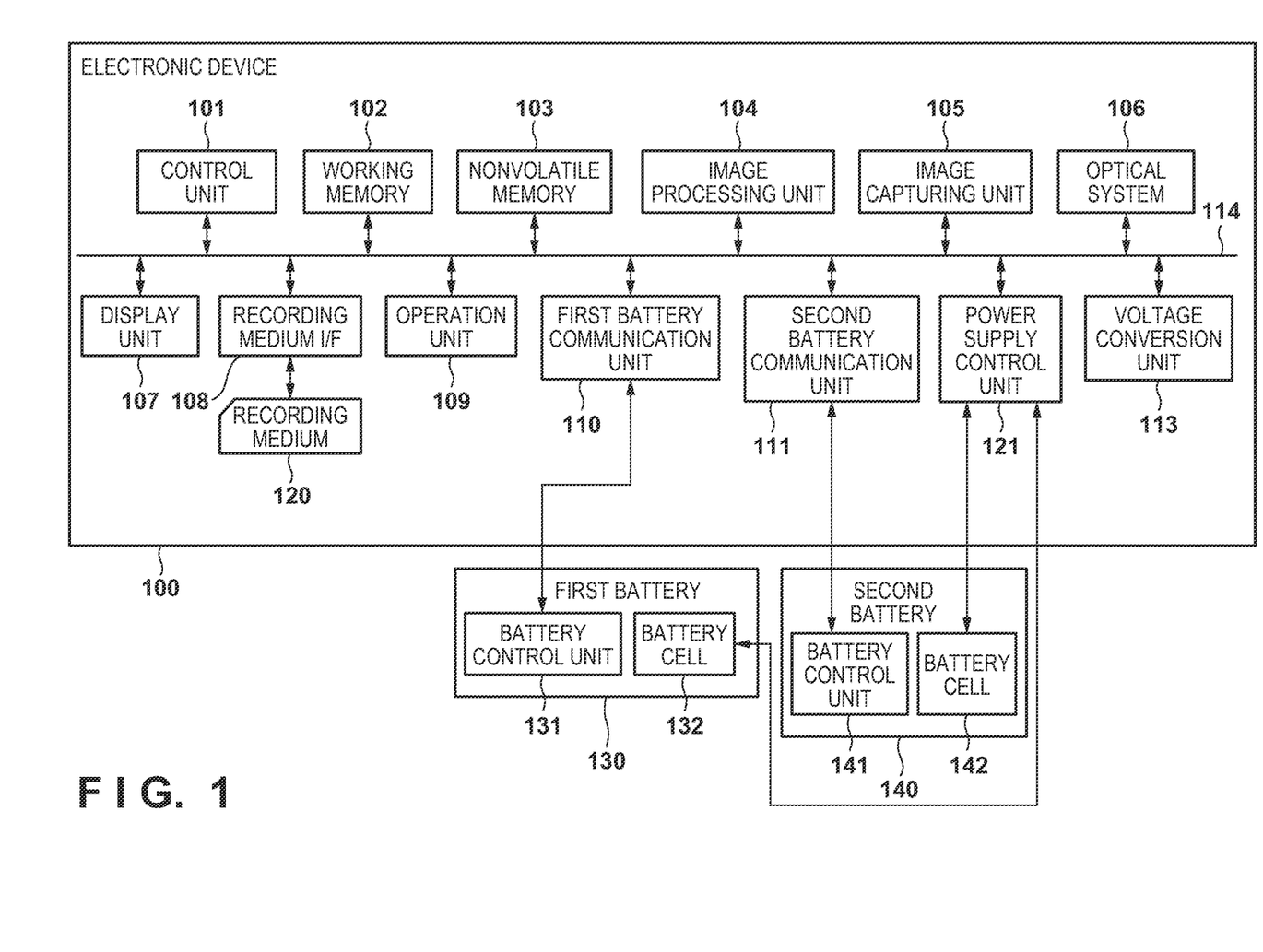
FIG. 1 is a block diagram illustrating components of electronic device 100 according to a first embodiment.

FIG. 1 is a block diagram illustrating components of the electronic device 100 according to the first embodiment.

In the first embodiment, a case in which the electronic device 100 is an image capture apparatus such as a digital camera will be described, but the present disclosure is not limited to the digital camera, and may be a mobile device such as a smartphone or a tablet terminal.

Further, in the first embodiment, an example in which a plurality of (e.g. two) battery grips to which a battery can be connected are connected to the electronic device 100 will be described. The battery grip is, for example, an accessory device that is attachable to and detachable from a camera body when the electronic device 100 is a digital camera. When the battery grip is connected, a battery cannot be connected to the electronic device 100, and power is supplied from the battery connected to the battery grip. Note that the number of batteries that can be connected to the battery grip is not limited to two, and may be three or more. Further, when the electronic device 100 is a mobile device such as a smartphone or a tablet terminal, it may be a portable power bank connectable to the mobile device as a backup power source.

First, components of the electronic device 100 according to the first embodiment will be described with reference to FIG. 1.

Control unit 101 includes a microcomputer including a hardware processor (e.g., a CPU), a memory, an interface circuit, and the like that comprehensively controls the entire electronic apparatus 100. The control unit 101 executes a program stored in nonvolatile memory 103 which will be described later, and thereby realizes processing of a flowchart which will be described later with reference to FIG. 7. Instead of the control unit 101 controlling the entire electronic device 100, the entire device may be controlled by a plurality of pieces of hardware sharing the processing.

Working memory 102 is, for example, a RAM or the like, and is used as a working area for loading constants, variables, programs read out from the nonvolatile memory 103 which will be described later, and the like for the operation of the control unit 101. The working memory 102 is also used as a buffer memory for temporarily storing image data captured by image capturing unit 105 which will be described later, and as an image display memory for display unit 107 which will be described later.

The nonvolatile memory 103 is an electrically erasable and recordable memory, and is, for example, an EEPROM. In the nonvolatile memory 103, constants, programs, and the like for the operation of the control unit 101 are recorded. Here, the program is a program for executing an operable time calculation processing of the electronic device 100, which will be described later.

Image processing unit 104 includes a hardware processor (e.g., a GPU) that performs resizing processing and color conversion processing on image data captured by the image capturing unit 105, which will be described later. Further, the image processing unit 104 generates an image file by compressing and encoding still image data subjected to the image processing in a JPEG format or the like, or by encoding moving image data in a moving image compression method for a predetermined container file format such as a MP4 format, and records the generated image file in recording medium 120 which will be described later. Further, the image processing unit 104 performs a predetermined arithmetic processing using the captured image data. The control unit 101 performs Automatic Focus (AF) processing and Automatic Exposure (AE) processing by controlling a focus lens, a diaphragm, and a shutter included in optical system 106 based on the arithmetic processing result of the image processing unit 104.

The image capturing unit 105 includes an image capturing element such as a CCD or a CMOS that converts an object image into electric signal, and an A/D converter that converts analog signal outputted from the image capturing element into digital signal.

The optical system 106 includes a lens, a diaphragm, a shutter, a mechanism unit that drives these elements, and the like. The image capturing unit 105 converts the object image light formed by the optical system 106 into electric signal by the image capturing element, performs noise reduction processing and the like, and outputs digital image data.

The display unit 107 displays a live view image at the time of shooting, displays a captured image, and displays characters for interactive operations. The display unit 107 is, for example, a display device such as a liquid crystal display or an organic EL display. The display unit 107 may be formed integrally with the electronic device 100 or may be connected to the electronic device 100 as an external device. The electronic device 100 may be connected to the display unit 107 and may have a function of controlling the display of the display unit 107.

Recording medium interface (I/F) 108 reads data from or writes data on the recording medium 120. The recording medium 120 is a memory card, a hard disk, or the like. Operation unit 109 includes an operation member such as a switch, a button, and a touch panel for accepting a user operation.

First battery communication unit 110 includes an interface circuit and the like that communicate with battery control unit 131 of first battery 130 which will be described later. The first battery communication unit 110 is communicably connected to the battery control unit 131 of the first battery 130 in a state where the first battery 130 is connected to the electronic device 100. The control unit 101 transmits and receives data to and from the battery control unit 131 of the first battery 130 via the first battery communication unit 110. For example, the control unit 101 transmits control signal relating to charging and discharging of the first battery 130 to the battery control unit 131 of the first battery 130 via the first battery communication unit 110. Further, the battery control unit 131 of the first battery 130 transmits information (battery information) relating to the first battery 130 to the control unit 101.

Second battery communication unit 111 includes an interface circuit and the like that communicate with battery control unit 141 of second battery 140 which will be described later. The second battery communication unit 111 is communicably connected to the battery control unit 141 of the second battery 140 in a state where the second battery 140 is connected to the electronic device 100. The control unit 101 transmits and receives data to and from the battery control unit 141 of the second battery 140 via the second battery communication unit 111. For example, the control unit 101 transmits control signal relating to charging and discharging of the second battery 140 to the battery control unit 141 of the second battery 140 via the second battery communication unit 111. Further, the battery control unit 141 of the second battery 140 transmits information (battery information) relating to the second battery 140 to the control unit 101.

Power supply control unit 112 includes a detection circuit that detects whether or not the battery is connected to the electronic device 100 and detects the type of the battery connected to the electronic device 100. The power supply control unit 112 controls voltage conversion unit 113 which will be described later, based on the detection result and an instruction from the control unit 101, and supplies a necessary voltage to each component of the electronic device 100 for a necessary period.

The power supply control unit 112 is electrically connected to battery cell 132 of the first battery 130 in a state where the first battery 130 is connected to the electronic device 100, and is capable of receiving power supplied from the first battery 130. Further, the power supply control unit 112 detects a discharge current of the first battery 130 from the battery cell 132 of the first battery 130, converts the detection result into digital signal, and outputs the converted digital signal to the control unit 101.

In addition, the power supply control unit 112 is electrically connected to battery cell 142 of the second battery 140 in a state where the second battery 140 is connected to the electronic device 100, and is capable of receiving power supplied from the second battery 140. Further, the power supply control unit 112 detects a discharge current of the second battery 140 from the battery cell 142 of the second battery 140, converts the detection result into digital signal, and outputs the converted digital signal to the control unit 101.

Further, the power supply control unit 112 includes a switch circuit or the like that selects at least one of the first battery 130 and the second battery 140 connected to the electronic device 100 as a power supply for supplying power to the electronic device 100.

The voltage conversion unit 113 includes a DC/DC converter or the like that converts the power received by the power supply control unit 112 from at least one of the first battery 130 and the second battery 140 into a voltage suitable for the operation of the electronic device 100.

Internal bus 114 includes an address bus, a data bus, and a control bus that connect the components 101 to 113 of the electronic device 100 so as to be able to exchange data.

The first battery 130 is a rechargeable battery, such as a NiCd battery, a NiMH battery, or a lithium-ion battery. The first battery 130 includes the battery control unit 131 and the battery cell 132. The battery control unit 131 includes a hardware processor, a memory, an interface circuit, and the like that can communicate with the control unit 101 via the first battery communication unit 110 in a state where the first battery 130 is connected to the electronic device 100. The battery control unit 131 performs control relating to charging and discharging of the first battery 130 based on control signal received from the control unit 101 via the first battery communication unit 110 of the electronic device 100. Further, the battery control unit 131 transmits the battery information of the first battery 130 to the control unit 101 via the first battery communication unit 110 of the electronic device 100. The battery cell 132 includes a plurality of cells capable of supplying power to the power supply control unit 112 in a state where the first battery 130 is connected to the electronic device 100, and the capacity (%) and the voltage (V) of the first battery 130 increase in proportion to the number of cells and the capacity per cell.

The second battery 140 is a rechargeable battery, such as a NiCd battery, a NiMH battery, or a lithium-ion battery. The second battery 140 includes the battery control unit 141 and the battery cell 142. The battery control unit 141 includes a processor, a memory, an interface circuit, and the like that can communicate with the control unit 101 via the second battery communication unit 111 in a state where the second battery 140 is connected to the electronic device 100. The battery control unit 141 performs control relating to charging and discharging of the second battery 140 based on control signal received from the control unit 101 via the second battery communication unit 111 of the electronic device 100. Further, the battery control unit 141 transmits the battery information of the second battery 140 to the control unit 101 via the second battery communication unit 111 of the electronic device 100. The battery cell 142 includes a plurality of cells capable of supplying power to the power supply control unit 112 in a state where the second battery 140 is connected to the electronic device 100, and the capacity (%) and the voltage (V) of the second battery 140 increase in proportion to the number of cells and the capacity per cell.

Next, the battery information according to the first embodiment will be described with reference to FIG. 2.

Figure 2:
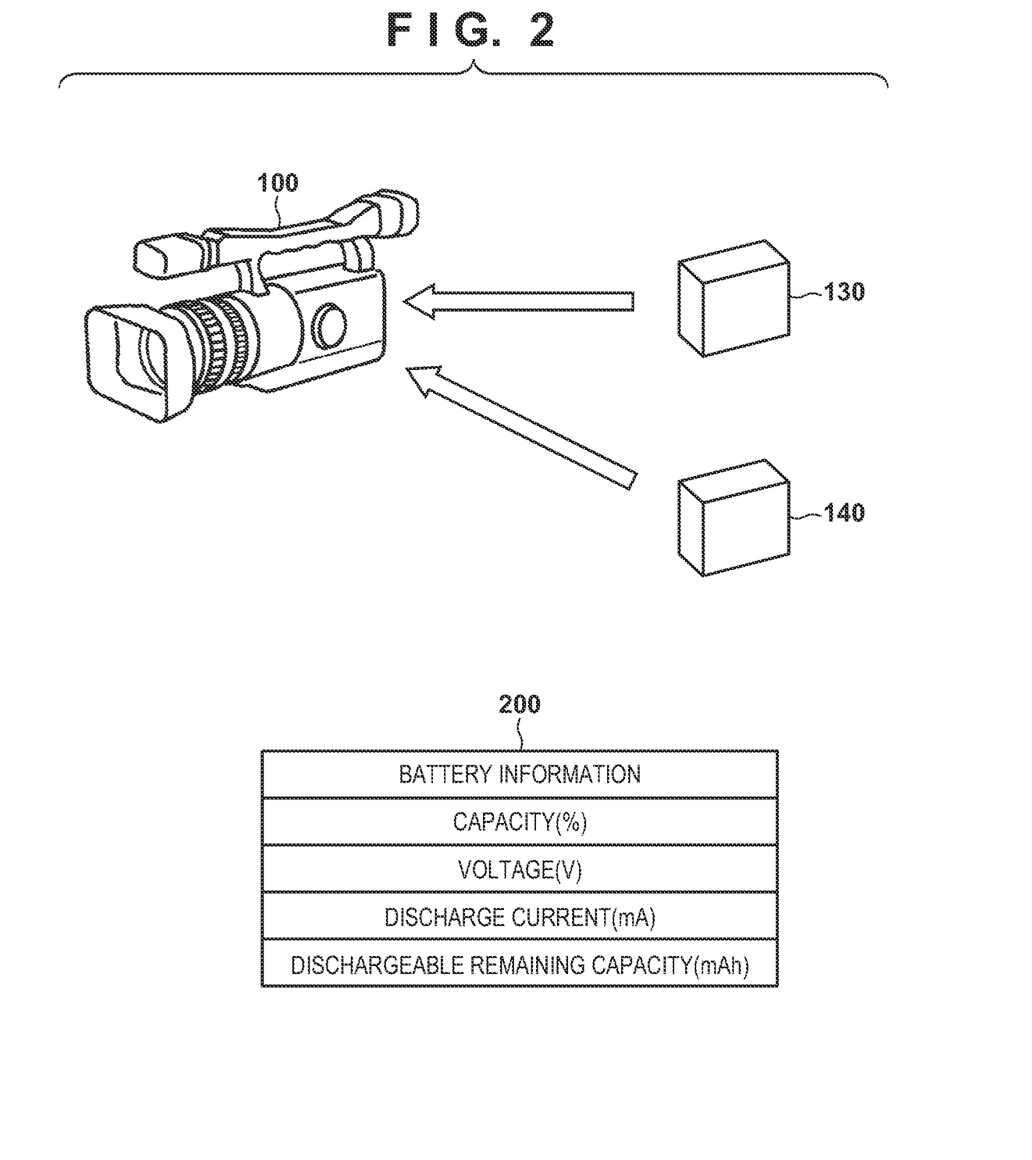
FIG. 2 is a diagram illustrating battery information according to the first embodiment.

FIG. 2 is a diagram illustrating the battery information 200 according to the first embodiment.

In a state where the first battery 130 and the second battery 140 are connected to the electronic device 100, the control unit 101 of the electronic device 100 receives the battery information 200 of the first battery 130 from the first battery 130. The battery information 200 of the first battery 130 includes a capacity (%), a voltage (V), a discharge current (mA), and a dischargeable remaining capacity (mAh). Further, in a state where the first battery 130 and the second battery 140 are connected to the electronic device 100, the control unit 101 of the electronic device 100 receives the battery information 200 of the second battery 140 from the second battery 140. The battery information 200 of the second battery 140 includes a capacity (%), a voltage (V), a discharge current (mA), and a dischargeable remaining capacity (mAh).

The electronic device 100 displays a battery icon 304 and an operable time 305 of the electronic device 100 on a display screen 300 which will be described later with reference to FIG. 3, based on the battery information acquired from the first battery 130 and the battery information 200 acquired from the second battery 140.

Next, the display screen of the electronic device 100 according to the first embodiment will be described with reference to FIGS. 3 and 4.

Figure 3:
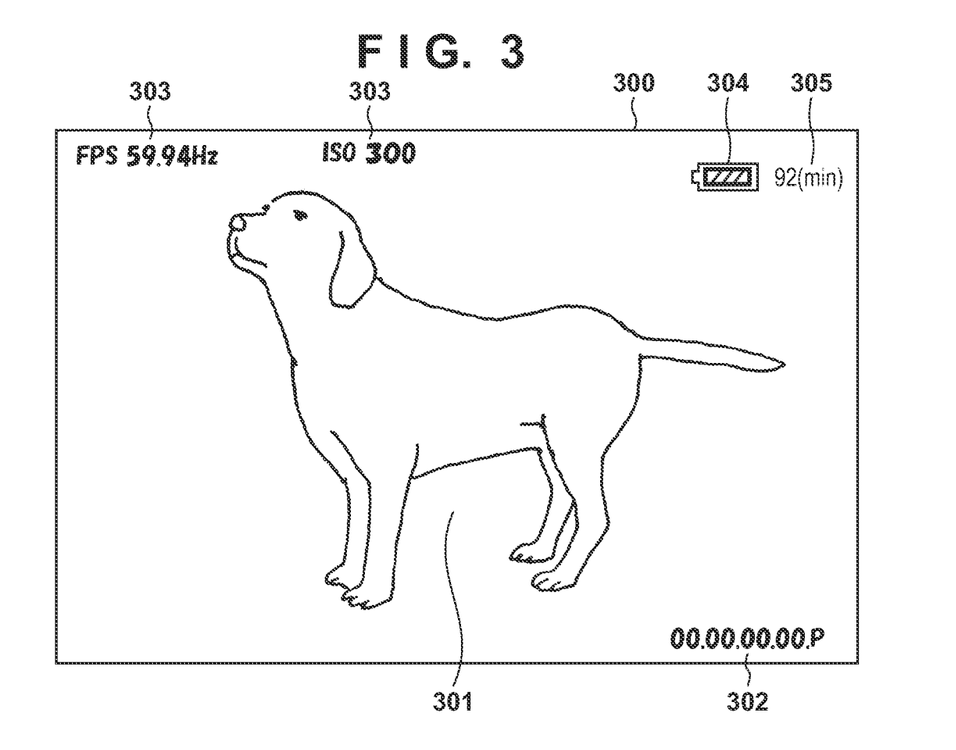
FIG. 3 is a diagram illustrating an example of a display screen of the electronic device according to the first embodiment.

FIG. 3 is a diagram illustrating an example of the display screen of the electronic device 100 according to the first embodiment.

In FIG. 3, the display screen 300 displays, for example, the battery icon 304 indicating a remaining capacity of the battery and the operable time 305 of the electronic device 100 in addition to information such as shot image 301, shooting time 302, and shooting setting 303.

The battery icon 304 indicates the capacity of the first battery 130 or the capacity of the second battery 140 that is connected to the electronic device 100. Further, the battery icon 304 indicates a total capacity obtained by averaging the capacity of the first battery 130 and the capacity of the second battery 140 in a state where the first battery 130 and the second battery 140 are connected to the electronic device 100.

The operable time 305 indicates a first operable time corresponding to a time period for which an electronic device 100 can operate by a first battery 130 connected to the electronic device 100. Alternatively, the operable time 305 indicates a second operable time corresponding to a time period for which the electronic device 100 can operate by the second battery 140 connected to the electronic device 100. Alternatively, the operable time 305 indicates a total operable time corresponding to a time period for which the electronic device 100 can operate by the first battery 130 and the second battery 140 connected to the electronic device 100.

Figure 4:
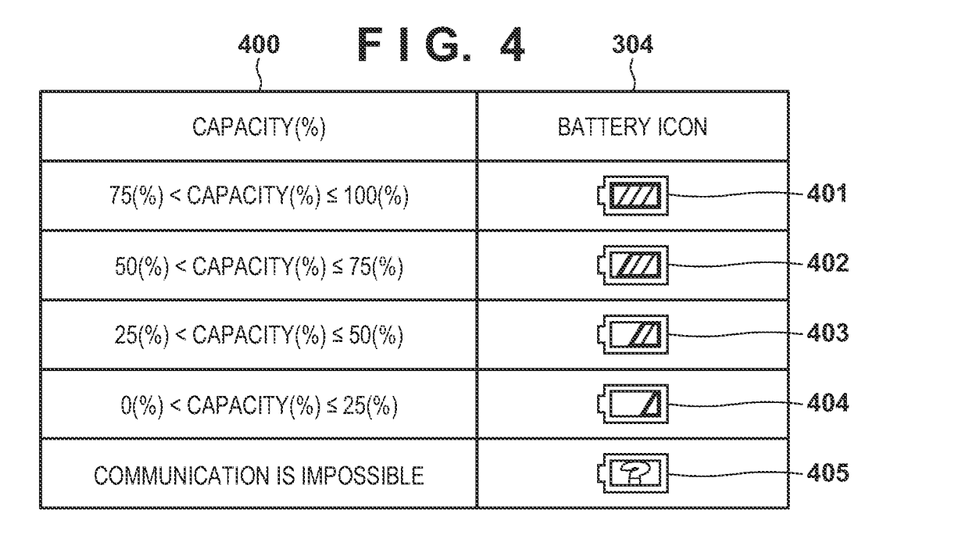
FIG. 4 is a diagram illustrating a type of a battery icon corresponding to a capacity of the battery according to the first embodiment.

FIG. 4 is a diagram illustrating a type of a battery icon corresponding to a capacity of a battery according to the first embodiment.

In FIG. 4, capacity (%) 400 of the battery indicates a capacity of the first battery 130 or a capacity of the second battery 140 or a total capacity of the first battery 130 and the second battery 140 connected to the electronic device 100.

In FIG. 4, when the capacity or the total capacity of the battery is greater than 75% and equal to or less than 100%, battery icon 401 indicating the entire battery is displayed in a diagonal line. When the capacity or the total capacity of the battery is greater than 50% and equal to or less than 75%, battery icon 402 indicating three quarters of the entire battery is displayed by a diagonal line. When the capacity or total capacity of the battery is greater than 25% and less than or equal to 50%, battery icon 403 indicating one half of the entire battery is displayed in a diagonal line. When the capacity or the total capacity of the battery is greater than 0% and less than or equal to 25%, battery icon 404 indicating one quarter of the entire battery is displayed by a diagonal line. In addition, when the battery information cannot be acquired because communication with the battery is impossible, battery icon 405 having a question mark added therein is displayed.

The electronic device 100 according to the first embodiment performs a first power supply control for supplying power from any one of the first battery 130 and the second battery 140 in a state where the first battery 130 and the second battery 140 are connected to the electronic device 100. In addition, the electronic device 100 according to the first embodiment performs a second power supply control for supplying power from both the first battery 130 and the second battery 140 in a state where the first battery 130 and the second battery 140 are connected to the electronic device 100.

The first power supply control is performed when the difference between the voltage of the first battery 130 and the voltage of the second battery 140 is greater than a predetermined threshold. In the first power supply control, the electronic device 100 performs control such that power is supplied from a battery having a greater voltage and power is not supplied from a battery having a lower voltage among the first battery 130 and the second battery 140.

In the first power supply control, power is supplied from any one of the first battery 130 and the second battery 140. Therefore, the voltage of the battery that is supplying power to the electronic device 100 decreases in accordance with the power supply to the electronic device 100. On the other hand, the voltage of the battery that is not supplying power does not decrease. As the voltage of the battery that is supplying power in the first power supply control decreases, the difference between the voltage of the first battery 130 and the voltage of the second battery 140 becomes equal to or less than a predetermined threshold. In this case, when the difference between the voltage of the first battery 130 and the voltage of the second battery 140 becomes equal to or less than the predetermined threshold, the second power supply control is performed instead of the first power supply control. In the second power supply control, power is supplied from both the first battery 130 and the second battery 140. In the second power supply control, the sum of the discharge current supplied from the first battery 130 and the discharge current supplied from the second battery 140 is equal to the discharge current (mA) supplied from one battery in the first power supply control. In the second power supply control, power (discharge current) supplied to the electronic device 100 is supplied from the first battery 130 and the second battery 140 by one half. Alternatively, power (discharge current) corresponding to the ratio of the voltage of the first battery 130 to the voltage of the second battery 140 is supplied from the first battery 130 and the second battery 140.

After switching from the first power supply control to the second power supply control, the second power supply control is continuously performed without returning to the first power supply control (while maintaining the difference between the voltage of the first battery 130 and the voltage of the second battery 140 at a predetermined threshold or less). In order to perform the first power supply control and the second power supply control as described above, the control unit 101 periodically acquires the battery information of the first battery 130 and the battery information of the second battery 140. Then, the control unit 101 controls whether to perform the first power supply control or the second power supply control using these battery information.

Next, a method of calculating an operable time of the electronic device 100 in a state where the first battery 130 and the second battery 140 are connected to the electronic device 100 according to the first embodiment will be described with reference to FIGS. 5 and 6.

First, a method of calculating an operable time of the electronic device 100 using the discharge current and the dischargeable remaining capacity acquired from the battery that is supplying power among the first battery 130 and the second battery 140 in the first power supply control will be described.

While a discharge current can be acquired from a battery that is supplying power, a discharge current cannot be acquired from a battery that is not supplying power. While information of the discharge current is transmitted from the battery that is not supplying power, since the battery is not supplying power, the value of the discharge current will indicate 0 (mAh). Therefore, in the first embodiment, information of the discharge current of the battery that is not supplying power is also described as "information that can be acquired from the battery that is supplying power but cannot acquired from the battery that is not supplying power, in the first power supply control". Therefore, the operable time of the electronic device 100 can be calculated from the discharge current and the dischargeable remaining capacity as a predetermined information acquired from the battery that is supplying power according to Equation 1.

Operable time (min)=Dischargeable remaining capacity (mAh)/Discharge current (mA)×60    (Equation 1)

Next, a method of calculating an operable time of the electronic device 100 when the first battery 130 is supplying power and the second battery 140 is not supplying power in the first power supply control will be described with reference to FIG. 5.

Figure 5:
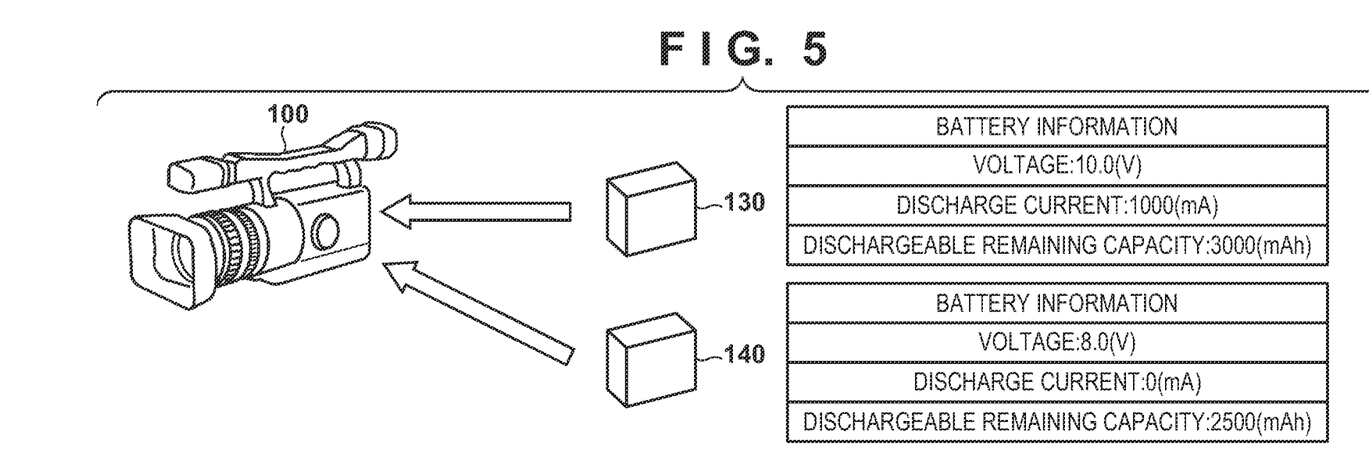
FIG. 5 is a diagram illustrating a method of calculating an operable time of the electronic device according to the first embodiment.

FIG. 5 is a diagram illustrating a method of calculating an operable time of the electronic device 100 when the first battery 130 is supplying power and the second battery 140 is not supplying power in the first power supply control.

When the first battery 130 is supplying power and the second battery 140 is not supplying power, the first operable time corresponding to the first battery 130 is calculated by Equation 1 using the discharge current and the dischargeable remaining capacity acquired from the first battery 130.

In the example of FIG. 5, since the dischargeable remaining capacity of the first battery 130 is 3000 (mA) and the discharge current is 1000 (mA), the first operable time corresponding to the first battery 130 is calculated by Equation 1 as follows.

180 (min)=3000 (mAh)÷1000 (mA)×60

On the other hand, since the second battery 140 is not supplying power, information indicating 0 (mAh) is transmitted as information of the discharge current from the second battery 140. Thus, the second operable time corresponding to the second battery 140 cannot be calculated by Equation 1 using such information of the discharge current from the second battery 140.

Therefore, according to the first embodiment, the discharge current of the second battery 140 is calculated using the battery information of the first battery 130.

In order to calculate the discharge current of the second battery 140, first, the power consumption of the electronic device 100 is calculated by Equation 2 using the voltage and the discharge current of the first battery 130.

Power consumption (W)=Battery voltage (V)×Discharge current (mA)　　(Equation 2)

In the example of FIG. 5, since the voltage of the first battery 130 is 10.0 (V) and the discharge current is 1000 (mA), the power consumption (W) of the electronic device 100 is calculated by Equation 2 as follows.

10 (W)=10.0 (V)×1 (A)

Next, using the power consumption (W) of the electronic device 100 calculated by Equation 2 and the voltage (V) of the second battery 140, the discharge current (mA) of the second battery 140 is calculated by Equation 3.

Discharge current (mA)=Power consumption (W)/Battery voltage (V)　　(Equation 3)

In the example of FIG. 5, since the power consumption of the electronic device 100 is 10 (W) and the voltage of the second battery 140 is 8.0 (V), the discharge current (mA) of the second battery 140 is calculated by Equation 3 as follows.

1.25 (A)=10 (W)÷8.0 (V)

Then, using the discharge current (mA) of the second battery 140 calculated by Equation 3, the second operable time corresponding to the second battery 140 is calculated by Equation 1.

In the example of FIG. 5, since the voltage of the second battery 140 is 8.0 (V), the second operable time corresponding to the second battery 140 is calculated by Equation 3 as follows.

120 (min)=2500 (mAh)÷1250 (mA)×60

Finally, the total operable time (300 (min)) of the electronic device 100 is calculated by summing the first operable time corresponding to the first battery 130 and the second operable time corresponding to the second battery 140 calculated by the above procedure.

In the example of FIG. 5, a case in which the first battery 130 is supplying power and the second battery 140 is not supplying power in the first power supply control has been described. Conversely, when the second battery 140 is supplying power and the first battery 130 is not supplying power, the operational time of the electronic device 100 can be calculated as well.

Next, a method of calculating an operable time of the electronic device 100 in the second power supply control will be described with reference to FIG. 6.

Figure 6:
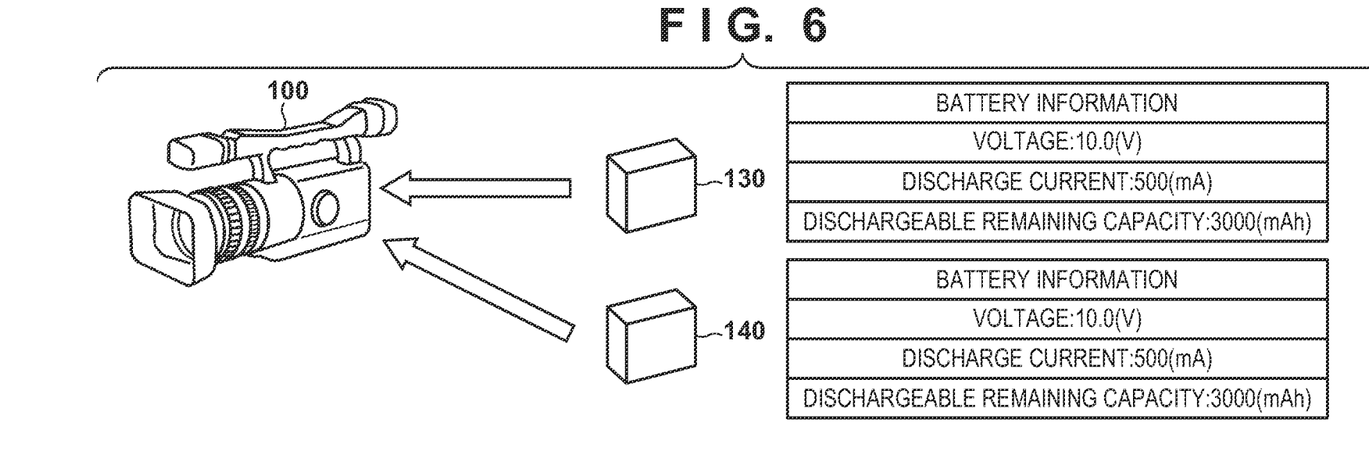
FIG. 6 is a diagram illustrating a method of calculating an operable time of the electronic device according to the first embodiment.

FIG. 6 is a diagram illustrating a method of calculating an operable time of the electronic device 100 in the second power supply control.

In the second power supply control, the total operable time of the electronic device 100 is calculated by Equation 1 using the average value of the dischargeable capacities of the first battery 130 and the second battery 140 and the average value of the discharge currents of the first battery 130 and the second battery 140.

In the example of FIG. 6, each of the dischargeable capacities of the first battery 130 and the second battery 140 is 3000 (mA), and each of the discharge currents is 500 (mA). Thus, using the average value of the dischargeable capacities of the first battery 130 and the second battery 140 and the average value of the discharge currents of the first battery 130 and the second battery 140, the operable time of the electronic device 100 is calculated by Equation 1 as follows.

360 (min)=(3000+3000)÷2 (mAh)÷(500+500)÷2 (mA)×60

Note that the first operable time corresponding to the first battery 130 and the second operable time corresponding to the second battery 140 may be calculated individually using Equation 1, and the average value of the first operable time and the second operable time may be calculated as the total operable time of the electronic device 100.

Next, an operable time calculation processing of the electronic device 100 in a state where the first battery 130 and the second battery 140 are connected to the electronic device 100 according to the first embodiment will be described with reference to FIG. 7.

Figure 7:
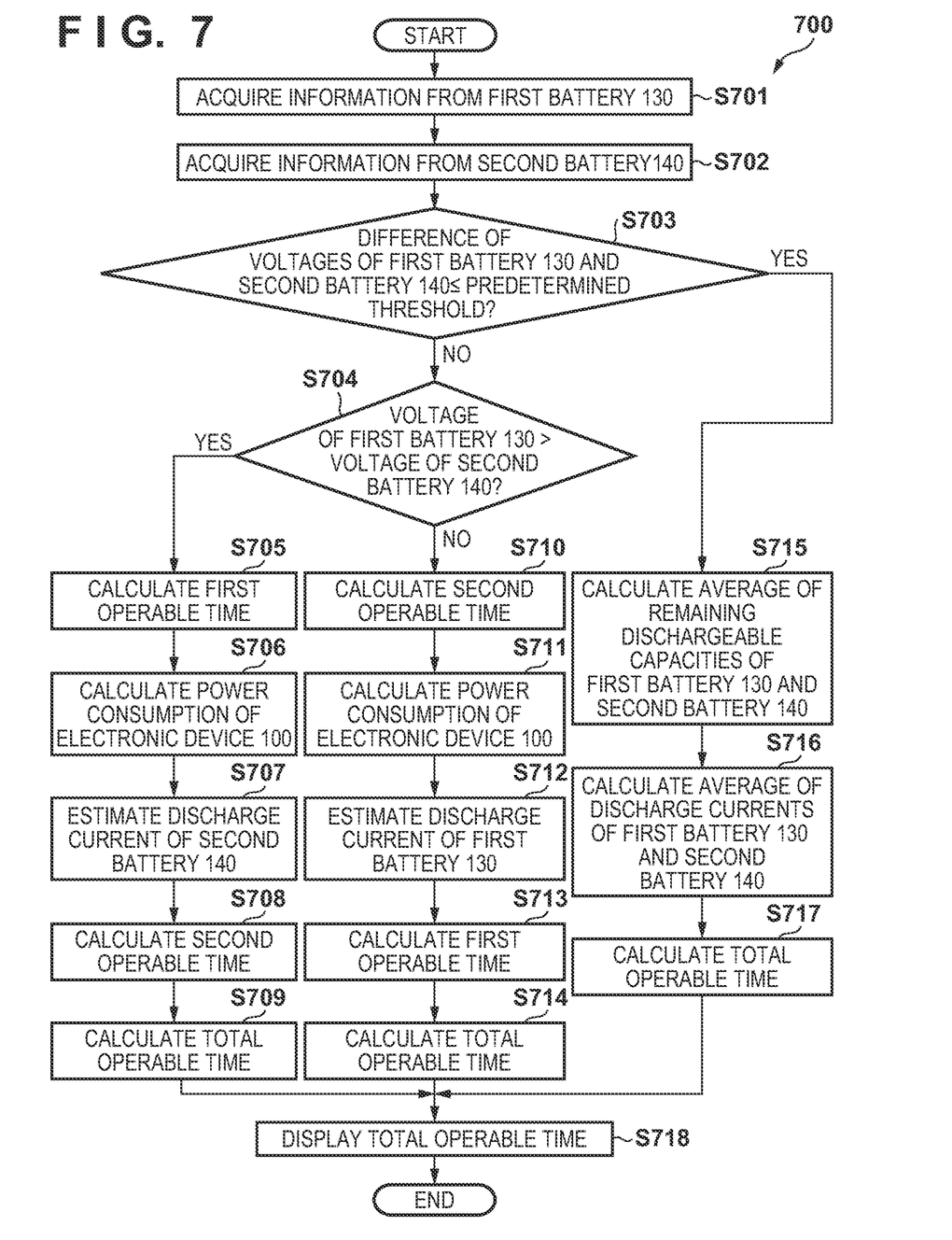
FIG. 7 is a flowchart illustrating an operable time calculation processing of the electronic device according to the first embodiment.

FIG. 7 is a flowchart illustrating an operable time calculation processing of the electronic device 100 according to the first embodiment.

The processing 700 in FIG. 7 is realized by the control unit 101 executing a program stored in the nonvolatile memory 103. The control unit 101 periodically executes the processing of FIG. 7. For example, the control unit 101 repeatedly executes the processing of FIG. 7 in one second cycles.

In step S701, the control unit 101 communicates with the first battery 130 via the first battery communication unit 110, and acquires the capacity, the voltage, the discharge current, and the dischargeable remaining capacity of the first battery 130. The control unit 101 stores the capacity, the voltage, the discharge current, and the dischargeable remaining capacity of the first battery 130 in the working memory 102, and advances the processing 700 to step S702.

In step S702, the control unit 101 communicates with the second battery 140 via the second battery communication unit 111, and acquires the capacity, the voltage, the discharge current, and the dischargeable remaining capacity of the second battery 140. The control unit 101 sores the capacity, the voltage, the discharge current, and the dischargeable remaining capacity of the second battery 140 in the working memory 102, and advances the processing 700 to step S703.

In step S703, the control unit 101 determines whether or not the difference between the voltage of the first battery 130 acquired in step S701 and the voltage of the second battery 140 acquired in step S702 is equal to or less than a predetermined threshold. When the control unit 101 determines that the difference between the voltage of the first battery 130 and the voltage of the second battery 140 is equal to or less than the predetermined threshold, the control unit 101 assumes that the first battery 130 and the second battery 140 is the same potential, and advances the processing 700 to step S715. When the control unit 101 is determines that the difference between the voltage of the first battery 130 and the voltage of the second battery 140 is greater than the predetermined threshold, the control unit 101 advances the processing 700 to step S704.

In step S704, the control unit 101 compares the voltage of the first battery 130 acquired in step S701 with the voltage of the second battery 140 acquired in step S702. Then, the control unit 101 determines whether or not the voltage of the first battery 130 is greater than the voltage of the second battery 140. When the control unit 101 determines that the voltage of the first battery 130 is greater than the voltage of the second battery 140, the control unit 101 advances the processing 700 to step S705. When the control unit 101 determines that the voltage of the first battery 130 is equal to or lower than the voltage of the second battery 140, the control unit 101 advances the processing 700 to step S710.

As described above, when the voltage of the first battery 130 is greater than the voltage of the second battery 140, the first power supply control is performed. Then, power is supplied from the first battery 130 to the electronic device 100, and power is not supplied from the second battery 140 to the electronic device 100. In the first embodiment, it is also described that when the voltage of the first battery 130 is greater than the voltage of the second battery 140, the control unit 101 executes the first mode of control. In step S705, the control unit 101 calculates the first operable time corresponding to the first battery 130 from Equation 1 using the discharge current and the dischargeable remaining capacity of the first battery 130 acquired in step S701. The control unit 101 stores the first operable time corresponding to the first battery 130 in the working memory 102, and advances the processing 700 to step S706.

In step S706, the control unit 101 calculates the power consumption of the electronic device 100 from Equation 2 using the voltage and the discharge current of the first battery 130 acquired in step S701. The control unit 101 stores the power consumption of the electronic device 100 in the working memory 102, and advances the processing 700 to step S707.

In step S707, the control unit 101 calculates the discharge current of the second battery 140 from Equation 3 using the power consumption of the electronic device 100 calculated in step S706 and the voltage of the second battery 140 acquired in step S702. The control unit 101 stores the calculated discharge current of the second battery 140 in the working memory 102, and advances the processing 700 to step S708.

In step S708, the control unit 101 calculates the second operable time corresponding to the second battery 140 from Equation 1 using the discharge current of the second battery 140 calculated in step S707 and the dischargeable remaining capacity of the second battery 140 acquired in step S702. The control unit 101 stores the second operable time corresponding to the second battery 140 in the working memory 102, and advances the processing 700 to step S709. In the first power supply control, the discharge current of the second battery 140 is information that can be acquired from the first battery 130 but cannot be acquired from the second battery 140. In this case, according to the processing from steps S706 to S709, the operable time corresponding to the second battery 140 is calculated using the information of the discharge current among the battery information acquired from the first battery 130 and information other than the information of the discharge current among the battery information acquired from the second battery 140.

In step S709, the control unit 101 calculates the total operable time obtained by summing the first operable time calculated in step S705 and the second operable time calculated in step S708. The control unit 101 stores the total operable time obtained by summing the first operable time and the second operable time in the working memory 102, and advances the processing 700 to step S718.

As described above, when the voltage of the second battery 140 is greater than the voltage of the first battery 130, the first power supply control is performed. Then, power is supplied from the second battery 140 to the electronic device 100, and power is not supplied from the first battery 130 to the electronic device 100. In the first embodiment, it is also described that when the voltage of the second battery 140 is greater than the voltage of the first battery 130, the control unit 101 executes the first mode of control. In step S710, the control unit 101 calculates the second operable time corresponding to the second battery 140 by using the discharge current and the dischargeable remaining capacity of the second battery 140 acquired in step S702. The control unit 101 stores the second operable time corresponding to the second battery 140 in the working memory 102, and advances the processing 700 to step S711.

In step S711, the control unit 101 calculates the power consumption of the electronic device 100 from Equation 2 using the voltage and the discharge current of the second battery 140 acquired in step S702. The control unit 101 stores the power consumption of the electronic device 100 in the working memory 102, and advances the processing 700 to step S712.

In step S712, the control unit 101 calculates the discharge current of the first battery 130 from Equation 3 using the power consumption of the electronic device 100 calculated in step S711 and the voltage of the first battery 130 acquired in step S701. The control unit 101 stores the discharge current of the first battery 130 in the working memory 102, and advances the processing 700 to step S713.

In step S713, the control unit 101 calculates the first operable time corresponding to the first battery 130 from Equation 1 using the discharge current of the first battery 130 calculated in step S712 and the dischargeable remaining capacity of the first battery 130 acquired in step S701. The control unit 101 stores the first operable time corresponding to the first battery 130 in the working memory 102, and advances the processing 700 to step S714. In the first power supply control, the discharge current of the first battery 130 is information that can be acquired from the second battery 140 but cannot be acquired from the first battery 130. In this case, according to the processing from steps S711 to S713, the operable time corresponding to the first battery 130 is calculated using the information of the discharge current among the battery information acquired from the second battery 140 and information other than the information of the discharge current among the battery information acquired from the first battery 130.

In step S714, the control unit 101 calculates the total operable time obtained by summing the second operable time calculated in step S710 and the first operable time calculated in step S713. The control unit 101 stores the total operable time obtained by summing the first operable time and the second operable time in the working memory 102, and advances the processing 700 to step S718.

In step S715, the control unit 101 calculates the average value of the dischargeable remaining capacity of the first battery 130 acquired in step S701 and the dischargeable remaining capacity of the second battery 140 acquired in step S702. The control unit 101 stores the average value of the dischargeable remaining capacity of the first battery 130 and the dischargeable remaining capacity of the second battery 140 in the working memory 102, and advances the processing 700 to step S716.

In step S716, the control unit 101 calculates the average value of the discharge current of the first battery 130 acquired in step S701 and the discharge current of the second battery 140 acquired in step S702. The control unit 101 stores the average value of the discharge current of the first battery 130 and the discharge current of the second battery 140 in the working memory 102, and advances the processing 700 to step S717.

In step S717, the control unit 101 calculates the total operable time of the electronic devices 100 by the first battery 130 and the second battery 140 from Equation 1 using the dischargeable remaining capacity calculated in step S715 and the discharge current calculated in step S716. The control unit 101 stores the total operable time of the electronic device 100 by the first battery 130 and the second battery 140 in the working memory 102, and advances the processing 700 to step S718.

In step S718, the control unit 101 displays the total operable times calculated in step S709, S714 or S717 on the display unit 107, and ends the processing 700. The control unit 101 displays the battery icon 304 and the operable time 305 of the electronic device 100 as in the display screen 300 illustrated in FIG. 3.

According to the first embodiment, when the plurality of batteries 130 and 140 are connected to the electronic device 100, the battery information that cannot be acquired from the battery 140 that is not supplying power is estimated using the battery information acquired from the battery 130 that is supplying power. This makes it possible to calculate the total operable time of the electronic device 100 based on the plurality of batteries 130 and 140.

Second Embodiment

The various functions, processing, or methods described in the above-described embodiment may also be realized by a computer of a device or an apparatus executing a program. In this case, the program is supplied to the computer of the device or the apparatus via a computer-readable storage medium. The computer-readable storage medium in the second embodiment includes, for example, a hard disk device, a magnetic storage device, an optical storage device, a magneto-optical storage device, a memory card, a volatile memory, or a nonvolatile memory. The computer-readable storage medium in the second embodiment is, for example, a non-transitory storage medium.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-206273, filed Dec. 20, 2021 which is hereby incorporated by reference herein in its entirety.

What is claimed is:

1. An electronic device comprising:
   a CPU; and
   a memory storing a program which, when executed by the CPU, causes the electronic device to function as the following units:
   a power receiving unit that receives power from a first battery and receives power from a second battery;
   an acquisition unit that acquires from the first battery a plurality of information relating to the first battery, including information of a discharge current of the first battery and acquires from the second battery a plurality of information relating to the second battery, including information of a discharge current of the second battery; and
   a control unit that calculates a first operable time for which the electronic device can operate using power from the first battery based on the plurality of information relating to the first battery acquired by the acquisition unit and calculates a second operable time for which the electronic device can operate using power from the second battery based on the plurality of information relating to the second battery acquired by the acquisition unit,
   wherein in a first mode in which the power receiving unit receives power from the first battery and does not receive power from the second battery, the control unit calculates the first operable time based on the plurality of information relating to the first battery acquired from the first battery, and calculates the second operable time based on information other than the information of the discharge current of the second battery among the plurality of information relating to the second battery acquired from the second battery and the information of the discharge current of the first battery acquired from the first battery.

2. The electronic device according to claim 1, wherein the plurality of information relating to the first battery include a voltage, a discharge current, and a dischargeable remaining capacity of the first battery, the plurality of information relating to the second battery include a voltage, a discharge current, and a dischargeable remaining capacity of the second battery, and in the first mode, the control unit calculates the discharge current of the second battery based on a power consumption obtained based on the information of the discharge current of the first battery and the voltage of the second battery, and calculates the second operable time based on the calculated discharge current of the second battery and the dischargeable remaining capacity of the second battery.

3. The electronic device according to claim 1, wherein in a second mode in which the power receiving unit receives power from the second battery and does not receive power from the first battery, the control unit calculates the second operable time based on the plurality of information relating to the second battery, and calculates the first operable time based on information other than the information of the discharge current of the first battery among the plurality of information relating to the first battery acquired from the first battery and the information of the discharge current of the second battery acquired from the second battery.

4. The electronic device according to claim 3, wherein
the plurality of information relating to the first battery include a voltage, a discharge current, and a dischargeable remaining capacity of the first battery,
the plurality of information relating to the second battery include a voltage, a discharge current, and a dischargeable remaining capacity of the second battery, and
in the second mode, the control unit calculates the discharge current of the first battery based on a power consumption obtained based on the information of the discharge current of the second battery and the voltage of the first battery, and calculates the first operable time based on the calculated discharge current of the first battery and the dischargeable remaining capacity of the first battery.

5. The electronic device according to claim 3, wherein
the control unit sets the electronic device to any one of a plurality of modes, including the first mode and the second mode, based on the voltage of the first battery and the voltage of the second battery, and
the control unit sets the electronic device to the first mode in a case that the voltage of the first battery is greater than the voltage of the second battery, and sets the electronic device to the second mode in a case that the voltage of the second battery is greater than the voltage of the first battery.

6. The electronic device according to claim 1, wherein
the control unit calculates a total time of the first operable time and the second operable time, and displays the total time on a display.

7. The electronic device according to claim 1, wherein
the electronic device is an image capture apparatus, and the first battery and the second battery are contained in an accessory device that is attachable to and detachable from the image capture apparatus.

8. An electronic device comprising:
a CPU; and
a memory storing a program which, when executed by the CPU, causes the electronic device to function as the following units:
a power receiving unit that receives power from a first battery and receives power from a second battery;
an acquisition unit that acquires from the first battery a plurality of information relating to the first battery, including information of a discharge current of the first battery and acquires from the second battery a plurality of information relating to the second battery, including information of a discharge current of the second battery; and
a control unit that calculates a first operable time for which the electronic device can operate using power from the first battery based on the plurality of information relating to the first battery acquired by the acquisition unit and calculates a second operable time for which the electronic device can operate using power from the second battery based on the plurality of information relating to the second battery acquired by the acquisition unit,
wherein in a case that the control unit performs a predetermined control such that the power receiving unit receives power from the first battery and does not receive power from the second battery, the control unit calculates the first operable time based on the plurality of information relating to the first battery, and calculates the second operable time based on a predetermined information that is acquired from the first battery and cannot be acquired from the second battery in the predetermined control among the plurality of information relating to the second battery and information other than the predetermined information among the plurality of information relating to the second battery.

9. The electronic device according to claim 8, wherein
the plurality of information relating to the first battery include a voltage, a discharge current, and a dischargeable remaining capacity of the first battery,
the plurality of information relating to the second battery include a voltage, a discharge current, and a dischargeable remaining capacity of the second battery, and
the predetermined information is information of the discharge current.

10. The electronic device according to claim 9, wherein
in the predetermined control, the control unit calculates the discharge current of the second battery based on a power consumption obtained based on the information of the discharge current of the first battery and the voltage of the second battery, and calculates the second operable time based on the calculated discharge current of the second battery and the dischargeable remaining capacity of the second battery.

11. A method of controlling an electronic device having a power receiving unit that receives power from a first battery and receives power from a second battery, the method comprising:
acquiring a plurality of information relating to the first battery, including information of a discharge current of the first battery from the first battery and a plurality of information relating to the second battery, including information of a discharge current of the second battery from the second batter; and
performing control so as to calculate a first operable time for which the electronic device can operate using power from the first battery based on the plurality of information relating to the first battery calculate a second operable time for which the electronic device can operate using power from the second battery based on the plurality of information relating to the second battery,
wherein in a first mode in which the electronic device receives power from the first battery and does not receive power from the second battery, the control calculates the first operable time based on the plurality of information relating to the first battery acquired from the first battery, and calculates the second operable time based on information other than the information of the discharge current of the second battery among the plurality of information relating to the second battery acquired from the second battery and the information of the discharge current of the first battery acquired from the first battery.

12. The method according to claim 11, wherein
the plurality of information relating to the first battery include a voltage, a discharge current, and a dischargeable remaining capacity of the first battery,
the plurality of information relating to the second battery include a voltage, a discharge current, and a dischargeable remaining capacity of the second battery, and
in the first mode, the control calculates the discharge current of the second battery based on a power consumption obtained based on the information of the discharge current of the first battery and the voltage of the second battery, and calculates the second operable time based on the calculated discharge current of the second battery and the dischargeable remaining capacity of the second battery.

13. The method according to claim 11, wherein
in a second mode in which the power receiving unit receives power from the second battery and does not receive power from the first battery, the control calculates the second operable time based on the plurality of information relating to the second battery, and calculates the first operable time based on information other than the information of the discharge current of the first battery among the plurality of information relating to the first battery acquired from the first battery and the information of the discharge current of the second battery acquired from the second battery.

14. The method according to claim 13, wherein
the plurality of information relating to the first battery include a voltage, a discharge current, and a dischargeable remaining capacity of the first battery, the plurality of information relating to the second battery include a voltage, a discharge current, and a dischargeable remaining capacity of the second battery, and
in the second mode, the control calculates the discharge current of the first battery based on a power consumption obtained based on the information of the discharge current of the second battery and the voltage of the first battery, and calculates the first operable time based on the calculated discharge current of the first battery and the dischargeable remaining capacity of the first battery.

15. The method according to claim 13, wherein
the control sets the electronic device to any one of a plurality of modes, including the first mode and the second mode, based on the voltage of the first battery and the voltage of the second battery, and
the control sets the electronic device to the first mode in a case that the voltage of the first battery is greater than the voltage of the second battery, and sets the electronic device to the second mode in a case that the voltage of the second battery is greater than the voltage of the first battery.

16. The method according to claim 11, wherein
the control calculates a total time of the first operable time and the second operable time, and displays the total time on a display unit.

17. The method according to claim 11, wherein
the electronic device is an image capture apparatus, and the first battery and the second battery are contained in an accessory device that is attachable to and detachable from the image capture apparatus.

* * * * *